Figure 1:
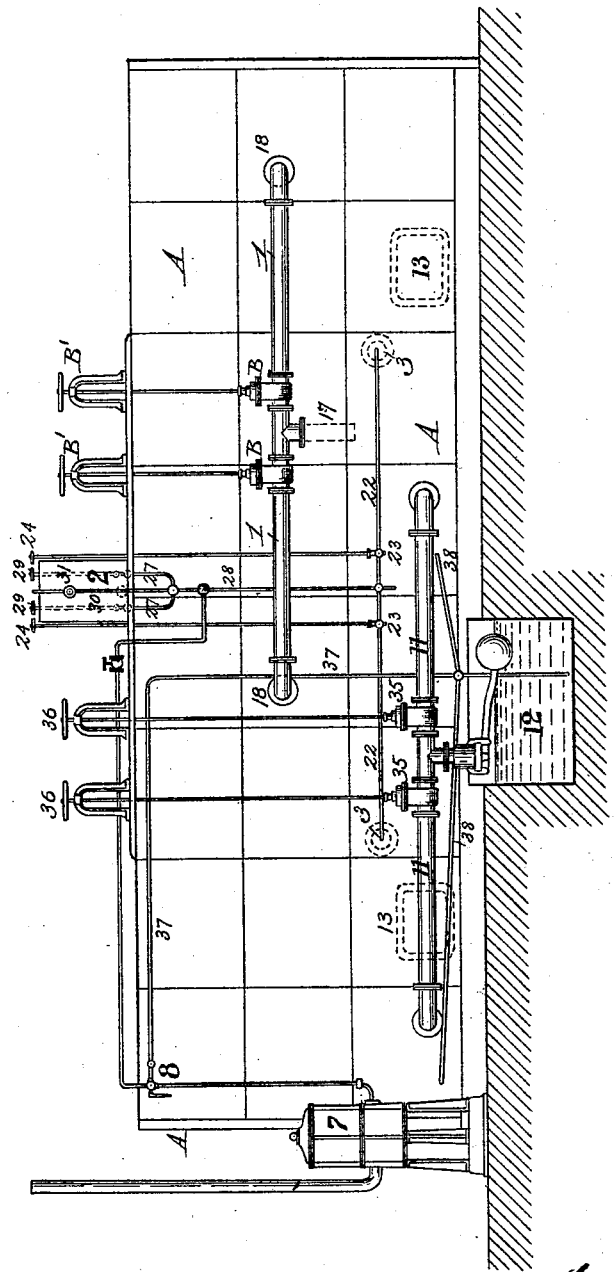

(No Model.) 3 Sheets—Sheet 1.

L. ARCHBUTT & R. M. DEELEY.
APPARATUS FOR PURIFYING WATER.

No. 521,522. Patented June 19, 1894.

Witnesses
Chas. F. Sensnor
Baltus D. Long

Inventors
Leonard Archbutt
R. M. Deeley
by their atty's
Baldwin Davidson & Wight (No Model.) 3 Sheets—Sheet 2.
L. ARCHBUTT & R. M. DEELEY.
APPARATUS FOR PURIFYING WATER.
No. 521,522. Patented June 19, 1894.
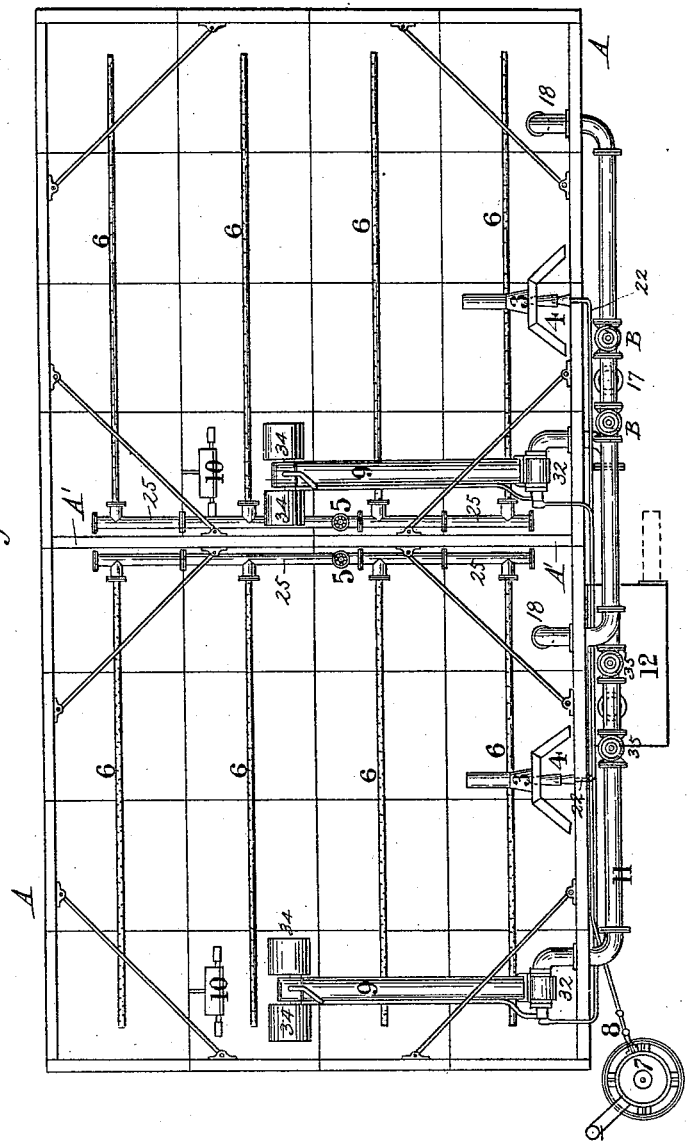
Witnesses
Chas. F. Sensner.
Baltus DeLong.
Inventors
Leonard Archbutt.
R. M. Deeley.
By their attys.
Baldwin Davidson & Wight.
THE NATIONAL LITHOGRAPHING COMPANY,
WASHINGTON, D. C.

(No Model.) 3 Sheets—Sheet 3.
L. ARCHBUTT & R. M. DEELEY.
APPARATUS FOR PURIFYING WATER.
No. 521,522. Patented June 19, 1894.
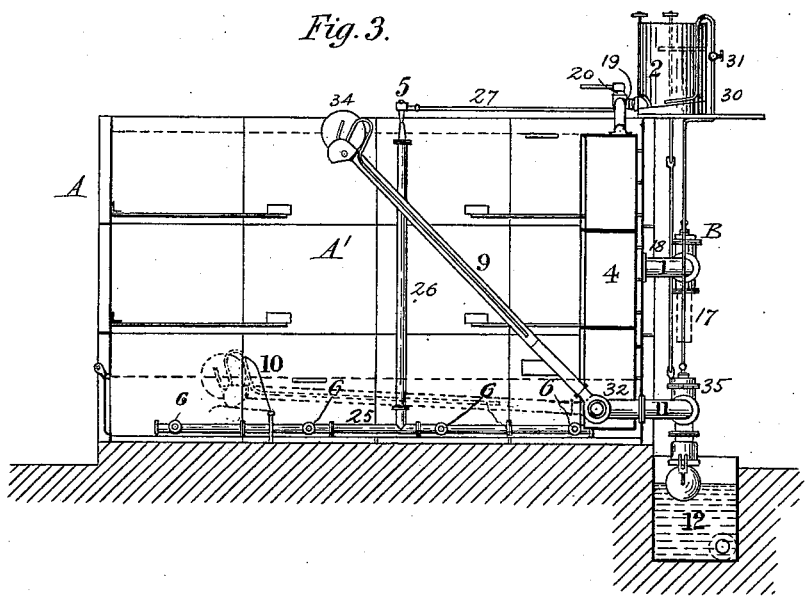
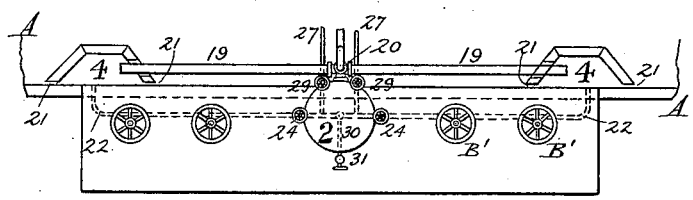
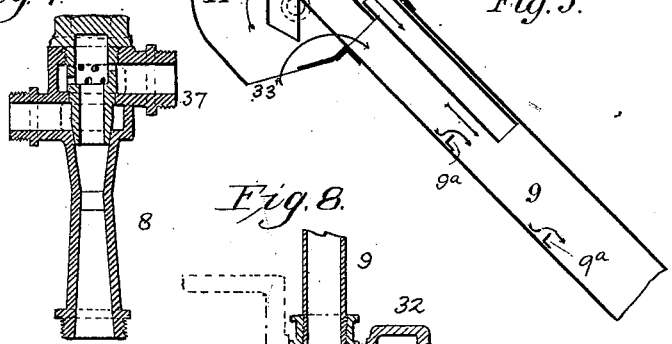
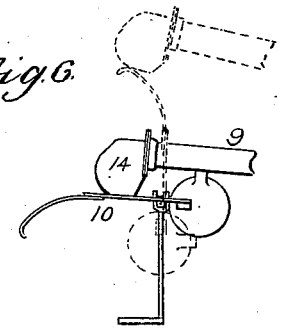
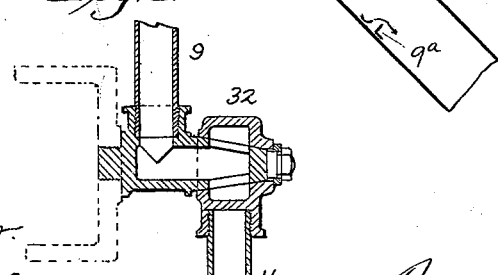
Witnesses
Chas. F. Sussner
Baltus S. Long
Inventors
Leonard Archbutt
R. M. Deeley
By their attys.
Baldwin Davidson Wight

UNITED STATES PATENT OFFICE.

LEONARD ARCHBUTT AND RICHARD M. DEELEY, OF DERBY, ENGLAND.

APPARATUS FOR PURIFYING WATER.

SPECIFICATION forming part of Letters Patent No. 521,522, dated June 19, 1894.

Application filed May 31, 1892. Serial No. 434,955. (No model.) Patented in England February 1, 1889, No. 1,791, and February 19, 1891, No. 3,051.

*To all whom it may concern:*

Be it known that we, LEONARD ARCHBUTT, chemist, residing at 11 Charnwood Street, and RICHARD MOUNTFORD DEELEY, mechanical engineer, residing at 10 Charnwood Street, Derby, England, subjects of the Queen of Great Britain, have invented certain new and useful Improvements in Apparatus for Purifying Water, (for which we have received Letters Patent in Great Britain, No. 1,791, dated February 1, 1889, and No. 3,051, dated February 19, 1891,) of which the following is a specification.

In softening water by means of lime it is well known that the precipitate takes many hours to settle and that although by the use of a salt of alumina the subsidence of the precipitate may be materially hastened yet the clarification of the water is tedious and in many cases but imperfectly effected.

We render the precipitation more rapid and the purification more complete by conducting the operation in a tank containing precipitate from a previous operation. After mixing the precipitating agent with the water and so obtaining a new precipitate we agitate the whole with the old precipitate and then leave it to settle. We use two tanks so that settlement may be going on in one tank while purified water is being drawn from the other. We also treat the purified water with combustion gases by which any remaining alkaline matter becomes bicarbonated.

In the apparatus which we provide there is a chamber inside the tank, the precipitating agent is supplied to this chamber and by an injector is driven out through a funnel like passage into the tank while at the same time water flows from the tank into the chamber above mentioned. In this way a rapid circulation and very effectual mixing is obtained. To stir up the old precipitate perforated air pipes are provided at the bottom of the tank and at the proper time air is driven through these into the tank by means of an injector. The draw off pipe is movable and is controlled by a float so that its mouth is always maintained at a short distance below the surface of the water in the tank. The combustion gases are introduced into this movable draw off pipe.

In order that our said invention may be fully understood and readily carried into effect we will proceed to describe the drawings hereunto annexed.

Figure 1 is a side elevation partly in section of the purifying tanks and apparatus connected therewith. Fig. 2 is a plan with the workman's platform and some other parts removed. Fig. 3 is a transverse section. Fig. 4 is a plan of the workman's platform with the valve controlling handles and other parts. Fig. 5 shows to a larger scale a part of one of the draw off pipes. Fig. 6 is a detail view of the upper end of the draw-off pipe and its rest. Fig. 7 is a detail view of the joint of the steam pipe with the gas pipe. Fig. 8 is a detail view of one of the joints of the gas pipe.

The drawings show a purifier suitable for the treatment of from five thousand to ten thousand gallons per hour. It consists of a cast iron tank A, measuring thirty-two feet by sixteen feet by ten feet high, divided into two equal parts by a transverse partition A' of cast or wrought iron. The two tanks thus formed are fitted up exactly in the same way and are intended to be used alternately so as to maintain a continuous supply of softened water. The water to be treated is supplied to the tanks by a supply pipe 1, having an entrance 17, and exits 18, 18. The pipe 1 is provided with valves B, opened by handles B', within convenient reach of the workman. The chemicals employed are mixed with water and dissolved in a small tank 2, above the tank A, and at one side thereof. Pipes 19 connect this tank with the two chambers 4, in the two divisions of the tank A, and a valve or cock 20 controls the supply. Each division of the tank A, is provided with a compartment or chamber 4, which is open at top and bottom, and also has narrow passages 21 up each side, by which water can enter it from the tank. Each chamber 4, is provided with an injector 3, of any approved form and construction through which the water from the chamber 4 is driven into the tank. The injectors have steam pipes 22 connected with any suitable supply and leading into the injector nozzles. Valves 23 operated by handles 24 control the supply of steam to the injectors.

When the steam valve of the injector being used is open, the contents of the chamber 4, are driven with force into the body of the tank, while a return from the tank to the chamber goes on by the passages left at the sides and bottom. A perfect mixture of the chemicals with the whole mass of water in the tank is thus rapidly made. A series of perforated pipes 6, in each division of the tank A, are connected to a transverse horizontal pipe 25, in turn connected to a vertical pipe 26, at the top of which is a nozzle 5, connected with a steam pipe 27, leading to a vertical pipe 28, coupled with the steam pipe 22. The supply of steam to the pipes 27, 27, is governed by valves 29.

When it is required to stir up the mud in the tank, air is blown down the pipe 26, by means of the nozzle 5, which injects steam into the pipe. A pipe 30, extends from the pipe 28, into the mixing tank 2, and the supply of steam is controlled by a valve 31. The floating discharge pipe is clearly shown in Figs. 2, 3 and 5. At its lower end this discharge pipe 9, is pivotally connected to an exit pipe 11, by a joint 32, of any suitable construction, and at its upper end, it is provided with a hood 14, having an opening 33, at its rear end, i. e., under the bottom of the pipe 9. Floats 34 (see Fig. 2), serve to keep the upper end of the discharge pipe near the water level with the mouth or opening 33 just below the surface, so that the water may be drawn off where it is clearest.

When the discharge pipe is in its lowest position, it is supported by the rest 10, (see Figs. 3 and 6.) This rest is provided with a baffle plate, and is hinged and counterweighted, as clearly shown, and yields to the weight of the discharge pipe as it descends. When in its lowest position, the opening 33, is free to allow the water to enter the hood 14, and thus pass to the discharge pipe. The fixed discharge pipe 11, has two valves 35 operated by handles 36 within convenient reach of the workman, and by opening one or the other of these valves, the water from one or the other of the tanks can be drawn into the receiving or service cistern 12, until it is full, when a ball cock stops the flow. The water is drawn off from the service cistern as it is required for use. As the water flows down the floating discharge pipe 9, it meets with carbonic acid gas generated in the stove 7, and propelled by steam, entering at an injector 8, the details of the joint where the steam pipe meets the gas pipe being shown in Fig. 7. From the injector 8, a pipe 37 extends, and is coupled to branch pipes 38, which lead to and connect with pipes 15, extending through the tops of the hoods 14, and into the discharge pipes 9, as indicated in Fig. 5. As the pipe 15 rises and falls with the discharge pipe 9, a hinged joint of suitable construction is employed. A construction such as shown in Fig. 8 is suitable for the purpose. The surplus gas escapes from the hood through an escape pipe 16. The discharge pipe 9, is shown as provided with weirs $9^a$ to impede the downflow of the water, and to provide for a more thorough mixture of the water with the gas, as the water tumbling over the weirs is spread so as to expose a large surface to the gas.

The process is conducted as follows:—Hard water is admitted to either tank by means of the supply pipe (1), which is connected up to a pump or main. The water is run in up to the level of the top of the well (4). While the tank is filling, the proper quantities of lime and sodium carbonate (fifty-eight per cent. soda ash) are weighed out, with the addition, in some cases, of a very small quantity of aluminum sulfate, and these are boiled up with water in the small chemical tank (2), by means of steam from the steam pipe shown in the drawings.

The quantity of chemicals employed may be regulated by the following rule: As much $Na_2CO_3$ is dissolved in a little water as is equivalent to the total $CaO+MgO$, deducting as much as is equivalent to the total alkalinity of the water. As much lime water as is necessary to give a pale straw coloration, with silver nitrate increased by as much as is equivalent to the total $MgO$ is added.

The injector (3) is put into action by opening its steam valve, and then the chemical mixture is run out of the chemical tank into the chamber. The injector creates a powerful current of water from the chamber, through the projecting pipe, across the tank, and into this current the chemicals pass. The chamber, being open at the sides and bottom, fills as rapidly as it empties, and by the circulation thus set up, rapid and thorough mixing of the chemicals and the hard water is effected. About five minutes after the chemical tank has been emptied and rinsed into the chamber, a little water is taken out of the softening tank with a dipper and poured into a small white basin containing a few drops of a solution of silver nitrate. If there be no excess of lime, a white milkiness will be produced, a very slight excess of lime will cause a straw color, and a larger excess will produce a brown precipitate. We aim at getting the straw color, and experience soon tells us, with any particular water, the right amount of lime to add; it is better to add too little lime than too much, as, if there be not quite enough, it is easy to boil a pound or two more and add it later. The traces of free lime do not injure the water for any purpose, as by the subsequent carbonating process, all free caustic alkali is neutralized, and converted into bicarbonate. After the chemicals have been added and mixed with the water, and the injector has been shut off, steam is admitted to the injector (5) which causes air to be sucked down the orifice and forced out of the perforations in the pipes laid close to the bottom of the tank. The currents caused by the rising air-bubbles carry up some of the mud from the bottom of the tank and thus diffuse throughout the water, in which the chemicals have produced a precipitate of fine particles, a large number of coarser and heavier particles, identical in crystalline structure with the fine particles. To these coarse particles, most of the fine particles soon become attached, and subsidence of the precipitate is thereby greatly promoted when the water is allowed to rest; and the further advantage is gained, that the chemical reaction, which becomes very sluggish in its last stages, is promoted by the presence of a larger number of crystalline particles in active movement throughout the water. After the blower has been in operation for fifteen minutes, the steam is turned off, and the water is allowed to rest. The result is, that in about thirty minutes very nearly all the precipitate will have settled to the bottom of the tank, and the water, down to a depth of six feet from the surface, will not contain on an average more than one grain per gallon of suspended matter. We may now begin to draw off.

The drawing off and carbonating are automatically and simultaneously effected by means of the floating discharge pipe (9), of rectangular section. Fuel gas from the coke stove (7) is forced continuously by means of the very small steam injector (8) along the horizontal branch of the gas pipe, down the vertical branch, to the four-way junction, where there is an outlet for the condensed water into the small tank (12); the gas passes thence up the sloping branch, through the side of the softening tank, to a small swivel which works concentrically with the large swivel of the discharge pipe; from the swivel the gas rises through a small pipe fixed to the discharge pipe, and finally enters the nozzle of the latter through the gas inlet (15) shown in the enlarged section of the hood (14). On leaving the end of the inlet pipe, the gas is caught by the current of water flowing down the discharge pipe which is repeatedly splashed upward by the ribs fixed at intervals along the bottom of the pipe, and in this way a thorough mingling of the gas and water is effected. The gas and water pass together through the ball tap fixed over the small tank (12) into which the softened and carbonated water falls, and from which it is drawn off for use, while the residual nitrogen, &c., of the fuel gas escapes into the air. If the small tank should fill up and cause the ball tap to close the outlet of the discharge pipe, the gas then accumulates in the pipe until the water in the nozzle is depressed below the orifice of the gas escape (16), up which the gas passes into the atmosphere without bubbling through and disturbing the water in the softening tank. When the water in the softening tank is getting low, the discharge nozzle, before it can approach too near the mud at the bottom of the tank, engages and tilts the baffle plate pivoted on the rest (10). This keeps the pipe from falling any lower, and also prevents the mud from being disturbed and drawn into the pipe. A strip of angle iron fixed to the side of the tank, two feet from the bottom, indicates the level down to which the water is drawn off. When the mud has accumulated to a depth of about twelve inches, it is stirred up with ordinary brooms and run out of the tank, through the mud doors (13), into a brick trough which conveys it into the drain. About one inch of mud is left in the tank to carry on the clarifying process.

The steam used by the injectors together is only sufficient to raise the temperature of the water about 3° Fahrenheit.

The amount of carbonic acid introduced into the softened water is very small, and simply has the effect of restoring the artificially softened water to the condition of a naturally soft water. Continuous carbonating is not always necessary.

The process softens water by means of the cheapest chemicals used in the most economical proportions. As the excess of alkali thus introduced into the water is quite small, the subsequent carbonating of the softened water is easily accomplished, and thereby a soft water is produced which is suitable for all purposes; it is palatable, forms no deposit in pipes or mains, and cannot injure the most delicate skin or fabric. By the system of treating the hard water in large volumes, intermittently, more reliable results are obtained than by any existing continuous process. The plant is cheap, and very simple; there is nothing about it to get out of order, and there are no filters to become clogged.

To remove calcium carbonate (carbonate of lime) from water costs very little, because lime alone is necessary, and it is very cheap. To remove calcium sulfate (sulfate of lime), alkali must be used, which greatly increases the cost. Both lime and alkali are necessary for the removal of magnesium salts, and, what is more, the alkali has to be used in greater relative proportion. Waters containing much magnesium salts are therefore the more costly to treat. But the costliness of softening, is in many cases, a measure of the necessity for softening; and it is often more economical to soften a bad water, which can be had for the pumping, than to purchase a town's water which is itself only less hard than the existing supply. The softening of the water may be effected by caustic soda alone but this is needlessly expensive.

What we claim is—

1. The combination of the softening tank, the open compartment or chamber therein for receiving the chemicals, the injector for maintaining a rapid circulation from the chamber to the tank and vice versa, an agitator for stirring the mud at the bottom of the tank, and a draw off pipe for discharging the clear water when the mud has settled.

2. The combination of the softening tank, means for mixing chemicals with the contents thereof, perforated pipes at the bottom of the tank, an injector for forcing air through such perforated pipes to agitate the mud at the bottom of the tank, and a draw off pipe for discharging the clear water when the mud has settled.

3. The combination of the softening tank, means for mixing chemicals with the contents thereof, an agitator for stirring the mud at the bottom of the tank, and a floating draw-off pipe.

4. The combination of the softening tank, means for mixing chemicals with the contents thereof, means for agitating the mud at the bottom of the tank, a draw-off pipe, and means for supplying combustion gases into the draw-off pipe.

LEONARD ARCHBUTT.
R. M. DEELEY.

Witnesses:
JOSEPH GEORGE NORDEN,
WM. ALLAN REID.